United States Patent
Muppalaneni et al.

(10) Patent No.: US 7,325,109 B1
(45) Date of Patent: Jan. 29, 2008

(54) METHOD AND APPARATUS TO MIRROR DATA AT TWO SEPARATE SITES WITHOUT COMPARING THE DATA AT THE TWO SITES

(75) Inventors: Nitin Muppalaneni, Santa Clara, CA (US); Abhijeet P. Gole, Campbell, CA (US); Michael L. Federwisch, San Jose, CA (US); Mark Smith, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 465 days.

(21) Appl. No.: 10/692,665

(22) Filed: Oct. 24, 2003

(51) Int. Cl.
*G06F 12/16* (2006.01)
*G06F 15/173* (2006.01)
*G06F 7/00* (2006.01)

(52) U.S. Cl. .................. 711/162; 709/226; 707/104

(58) Field of Classification Search ............. None
See application file for complete search history.

(56) References Cited

U.S. PATENT DOCUMENTS

| | | | |
|---|---|---|---|
| 6,636,879 B1* | 10/2003 | Doucette et al. | 707/205 |
| 6,691,245 B1* | 2/2004 | DeKoning | 714/6 |
| 6,745,303 B2* | 6/2004 | Watanabe | 711/161 |
| 2002/0194529 A1* | 12/2002 | Doucette et al. | 714/6 |
| 2003/0014523 A1* | 1/2003 | Teloh et al. | 709/226 |
| 2003/0084242 A1* | 5/2003 | Strange et al. | 711/114 |
| 2004/0153736 A1* | 8/2004 | Viswanathan et al. | 714/6 |
| 2005/0010592 A1* | 1/2005 | Guthrie | 707/104.1 |

* cited by examiner

*Primary Examiner*—Hyung Sough
*Assistant Examiner*—Duc T. Doan
(74) *Attorney, Agent, or Firm*—Blakely Sokoloff Taylor & Zafman LLP

(57) ABSTRACT

In one embodiment, the present invention provides a method for mirroring data representing a file system. The data is stored on a primary storage server and is mirrored on a secondary storage server. In the method the file system is mirrored without comparing blocks used to that represent the file system at the primary storage server, and the secondary storage server.

7 Claims, 8 Drawing Sheets

METHOD AND APPARATUS TO MIRROR DATA AT TWO SEPARATE SITES WITHOUT COMPARING THE DATA AT THE TWO SITES

FIELD OF THE INVENTION

At least one embodiment of the present invention pertains to data storage and backup techniques, and more particularly, to a method and apparatus for mirroring data at two separate sites.

BACKGROUND

As used herein, the term "file" should be interpreted broadly to include any type of data organization whether file-based or block-based. Further, as used herein, the term "file system" should be interpreted broadly as a programmatic entity that imposes structure on an address space of one or more physical or virtual disks so that an operating system may conveniently deal with data containers, including files and blocks. An "active file system" is a file system to which data can be both written and read, or, more generally, an active store that responds to both read and write I/O operations.

A file server is a type of storage server which operates on behalf of one or more clients to store and manage shared files in a set of mass storage devices, such as magnetic or optical storage based mass storage devices. The mass storage devices are typically organized as one or more groups of Redundant Array of Independent (or Inexpensive) Mass storage devices (RAID). One configuration in which file servers can be used is a network attached storage (NAS) configuration. In a NAS configuration, a file server can be implemented in the form of a server, called a filer, that attaches to a network, such as a local area network (LAN) or a corporate intranet. An example of such a server is any of the NetApp Filer products made by Network Appliance, Inc. in Sunnyvale, Calif.

A file server can be used to backup data, among other things. One particular type of data backup technique is known as "mirroring". Mirroring involves backing up data stored at a primary site by storing an exact duplicate (an image) of the data at a remote secondary site. The purpose is that, if data is ever lost at the primary site, it can be recovered from the secondary site.

In a simple example of a mirroring configuration, a source file server located at the primary site may be coupled locally to a first set of mass storage devices, to a set of clients through a local area network (LAN), and to a destination file server located at a remote site through a wide area network (WAN) or a metropolitan area network (MAN). The destination storage server located at the remote site is coupled locally to a second set of mass storage devices at the secondary site.

The source file server receives various read and write requests from the clients. In a system which handles large volumes of client requests, it may be impractical to save data modifications to the mass storage devices every time a write request is received from a client. The reason for this is that mass storage device accesses tend to take a relatively long time compared to other operations. Therefore, the source file server may instead hold write requests in memory temporarily and save the modified data to the mass storage devices periodically, such as every 10 seconds or at whatever time interval is appropriate. The event of saving the modified data to the mass storage devices is called a "consistency point".

At a consistency point, the source file server saves any data that was modified by the write requests to its local mass storage devices and also triggers a process of updating the data stored at the secondary site to mirror the data stored at the primary site. The process of updating the data at the secondary site is referred to as the "synchronization" or "sync" phase of the consistency point (CP) event, or simply "CP sync".

In the known prior art, the CP sync phase involves comparing a representation of the active state of a file system stored at the secondary site with a corresponding representation of the active state of the file system stored at the primary site, in order to determine what modifications or changes are required to synchronize the data on the primary and secondary sites. This comparison is computationally intensive. Therefore, it is desirable to avoid having to perform such a comparison.

SUMMARY OF THE INVENTION

In one embodiment, the present invention provides a method for mirroring data on a first storage server and a second storage server. In the method write commands are queued at the first storage server between consistency points. The write commands are to write data corresponding to a file system of the first storage server to a local mass storage device coupled to the first storage server. At a start of each consistency point, the write commands are sent to a local mass storage device and to a remote mass storage device coupled to the second storage server. The memory blocks of the local and remote mass storage devices are then updated based on the write commands. At an end of each consistency point, a representation to reference each memory block of the local mass storage server that is in use to represent the file system is constructed by the first storage server. At least a portion of the representation is sent to the second storage server by the first storage server.

DETAILED DESCRIPTION

Figure 1:
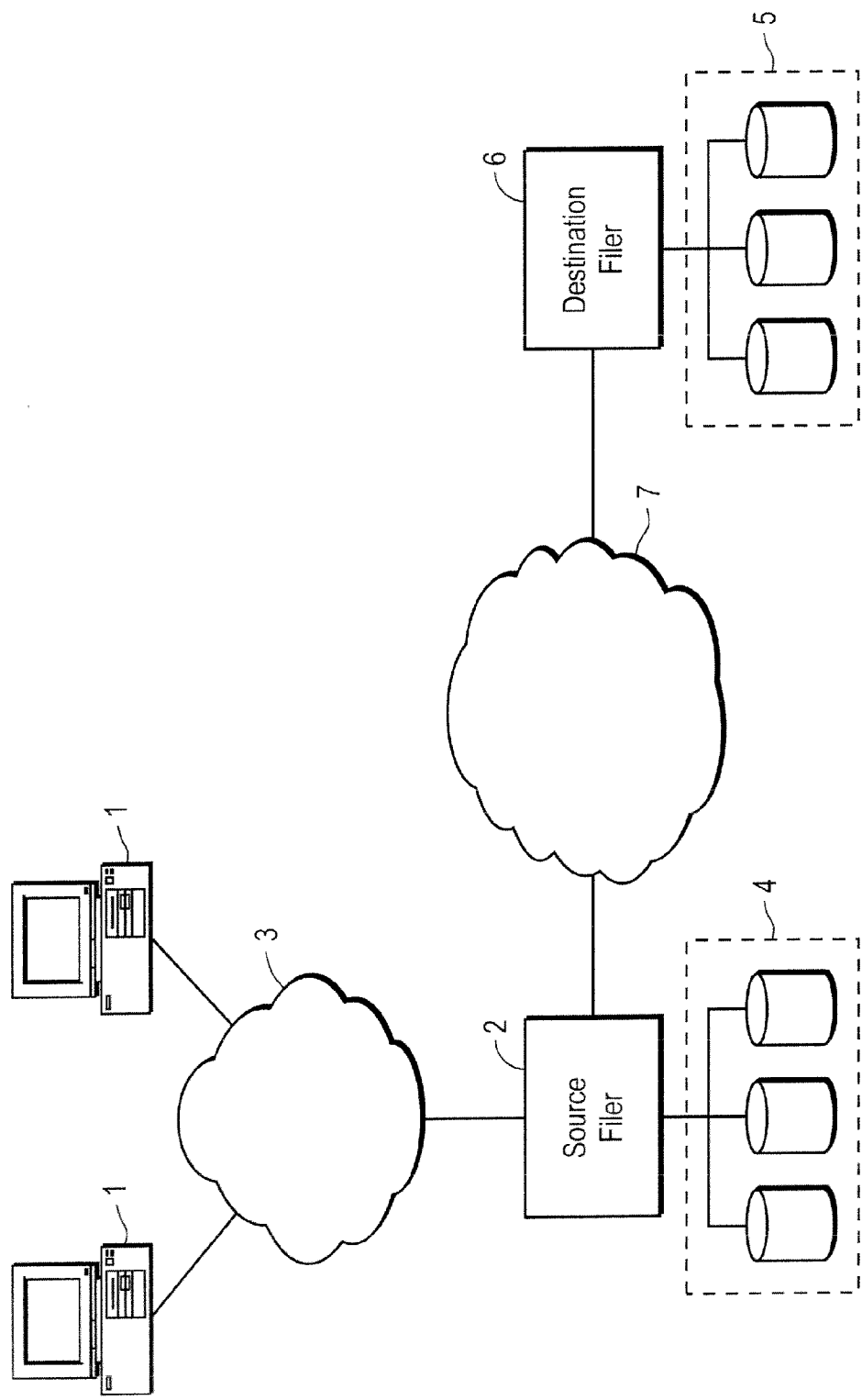
FIG. 1 illustrates an example of a network configuration to facilitate data backup using synchronizing mirroring.

A method and apparatus for mirroring data stored on a first and second filer are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, a primary storage server at a primary site receives various write requests from a set of clients. These write requests are in a high-level protocol including file and block-based protocols such as the Network File System (NFS), the Common Internet File System (CIFS), the Small Computer System Interconnect (SCSI), and/or the Hypertext Transport Protocol (HTTP). In one embodiment, the primary storage server generates block-level write commands based on the write requests and queues these block-level write commands between consistency points. In another embodiment, if the write requests include block-level write commands then these block-level write commands are queued between consistency points without having to generate the block-level write commands. At each consistency point, the primary storage server issues the queued block-level write commands to its local set of mass or block storage devices in order to save data, modified per the write requests received from the clients to the local mass storage devices. The block-level write commands are simultaneously sent to the secondary site by the primary storage server so that the data is also saved to a remote mass or block storage device coupled to a secondary storage server at the secondary site. The data is written to the memory blocks at the local and remote mass storage devices in accordance with a scheme wherein memory blocks that are used by a file system of the primary and secondary storage servers, are not overwritten. Within this scheme, two types of memory blocks are possible, namely data blocks, and address blocks. A data block is a block of memory that holds data, and an address block is a block of memory that stores a pointer to a data block. At the end of each consistency point, the primary storage server creates a representation that references each block of its local mass storage devices that contains data that is part of an active state of the file system of the primary storage server. This representation is sent to the secondary storage server so that the secondary storage server has a consistent version or image of the active state of the file system.

In one embodiment, the representation includes a tree data structure. Each memory block in use by the active file system forms a node in the tree data structure. Advantageously, in one embodiment, instead of sending the entire representation to the secondary storage server, only a root node of the tree data structure is sent. The secondary storage server is able to reconstruct the entire tree data structure from the root node because of the above-described scheme used to write data to the memory blocks. An advantage of the synchronizing techniques described herein is that data can be mirrored on the primary and secondary storage sites without having to compare the data at the primary and secondary sites.

FIG. 1 illustrates an example of a network configuration to facilitate data backup using mirroring. A number of client processing systems ("clients") 1 are coupled to a filer 2 located at a primary site through a first network 3, such as a LAN. Each of the clients 1 may be, for example, a conventional personal computer (PC), workstation, or the like. The filer 2 provides the clients 1 with access to files stored on a first set of mass or block storage devices 4, such as magnetic or optical mass storage devices, which may be configured as one or more RAID groups. Data stored in mass storage devices 4 is considered to be the primary copy, which is mirrored on a second set of mass or block storage devices 5 located at a remote secondary site, access to which is controlled by a second filer 6. In the reminder of this description, the devices 4 and 5 will simply be referred to as "disks". In this description, the first filer 2 is referred to as the "source filer" 2, while the second filer 6 is referred to as the "destination filer" 6. The source filer 2 and destination filer 6 are coupled to each other through a network 7, such as a WAN. As described further below, certain techniques of the present invention are implemented within the source filer 2, while others are implemented within the destination filer 6.

Note that the configuration of FIG. 1 is a simple one, selected for this description to facilitate explanation of the techniques introduced herein. However, these techniques can also be applied in many other different network configurations. For example, in some alternative configurations, the destination filer 6 may serve a separate set of clients coupled to it. As another example, at least some of disks 5 may be configured to operate under the direct control of the source filer 2 and/or at least some of disks 4 may be configured to operate under the direct control of the destination filer 6 (i.e., a cluster-failover configuration). Furthermore, in some configurations, one or more additional filers may be coupled to the source filer 2 and/or to the destination filer 6.

In the illustrated system, write requests are temporarily stored in memory in the source filer 2, and data modified by the requests are saved to disks 4 from time to time, i.e., at consistency points.

Figure 2:
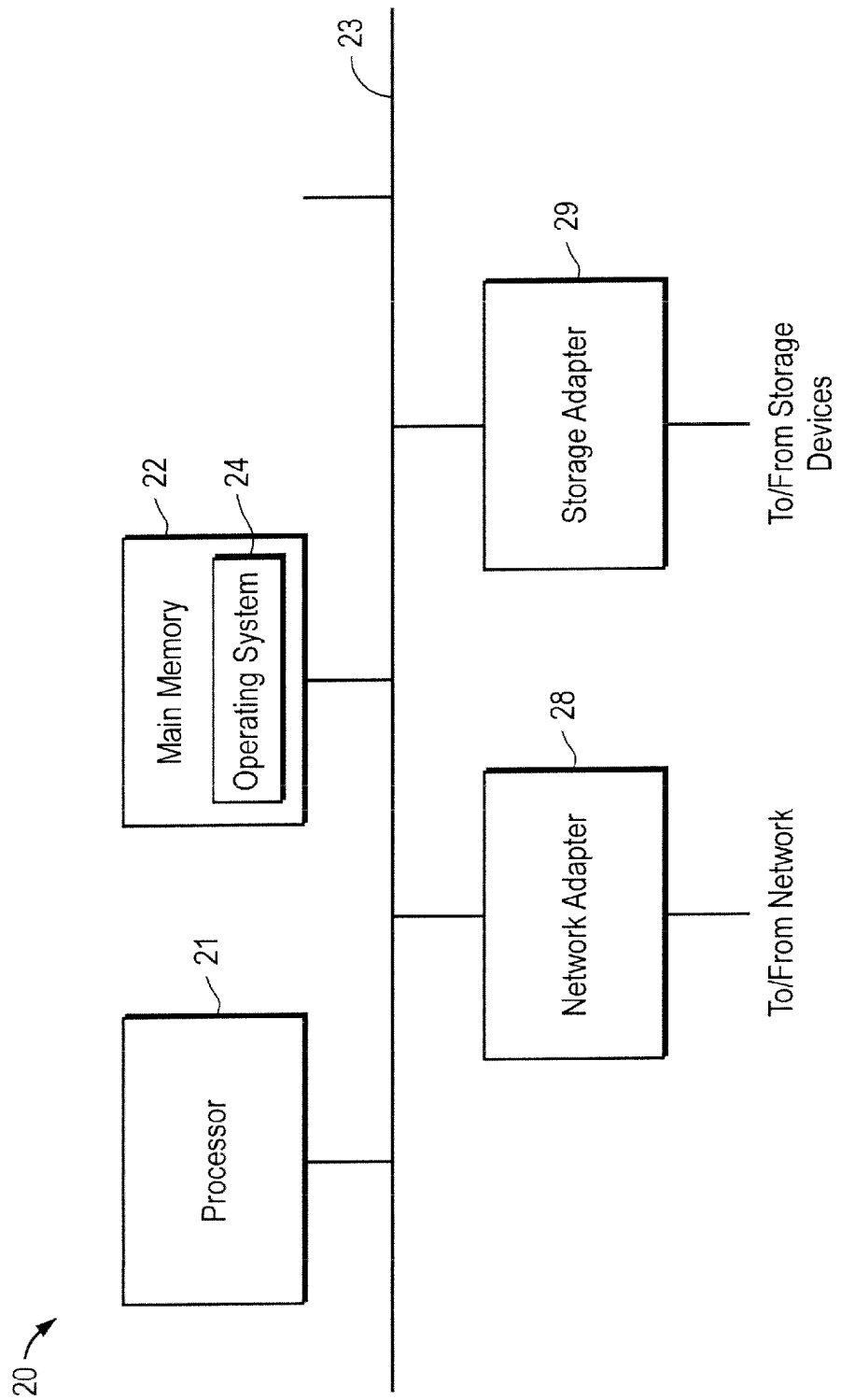
FIG. 2 is a conceptual block diagram of the architecture of a filer.

FIG. 2 shows the architecture of a filer 20, representative of the source filer 2 or the destination filer 6, according to certain embodiments of the invention. Note that certain standard and well-known components which are not germane to the present invention are not shown. The filer 20 includes a processor 21 and main memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the filer 20 and, thus, controls the overall operation of the filer 20. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 22, which is generally some form of random access memory (RAM), stores the operating system 24 of the filer 20. Techniques of the present invention may be implemented within the operating system 24, as described further below.

Also connected to the processor 21 through the bus system 23 are a network adapter 28 and a storage adapter 29. The network adapter 28 provides the filer 20 with the ability to communicate with remote devices, such as clients and/or another filer, over a network and may be, for example, an Ethernet adapter. The storage adapter 29 allows the filer to access the external disks and may be, for example, a Fibre Channel adapter or SCSI adapter.

Figure 3:
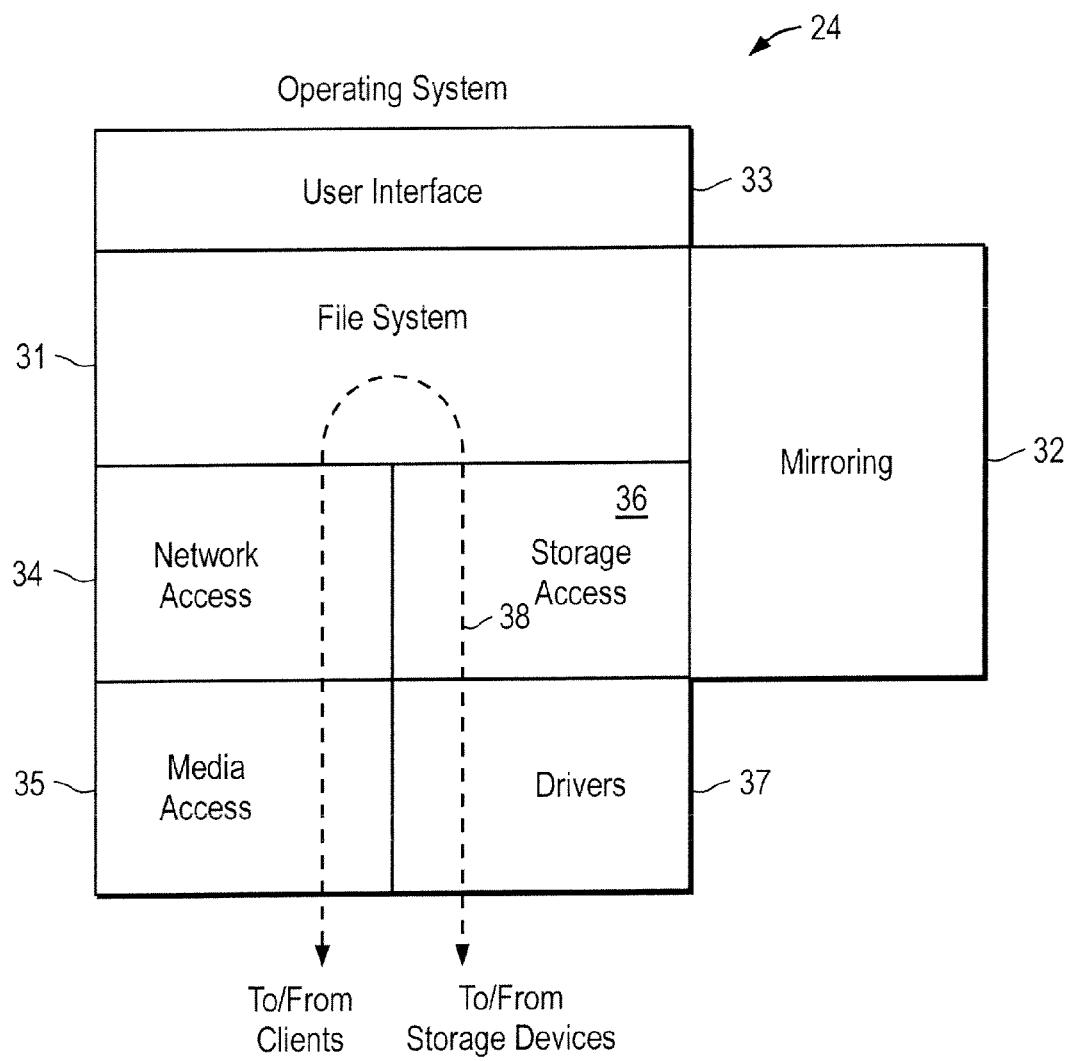
FIG. 3 is a block diagram of the operating system of a filer.

FIG. 3 illustrates the operating system 34 of the filer 20, according to certain embodiments of the invention. As can be seen, the operating system 24 includes a number of layers. The core of the operating system 24 is the file system 31 which, among other responsibilities, executes read and write operations on the disks in response to client requests, maintains directories, and manages consistency point operations. An example of a file system suitable for this purpose is the Write Anywhere File Layout to (WAFL) file system from Network Appliance, such as used in the NetApp Filers. The file system 31 operates on blocks of data of a predetermined size, such as 4 Kbytes. Also shown in FIG. 3 is the logical data path 38 from clients to disks, through the file system 31.

Above the file system 31, the operating system 24 also includes a user interface 33, through which a network administrator or other user can control and/or configure the filer (e.g., remotely from a management station). The user interface 33 may generate a command line interface and/or a graphical user interface for this purpose.

Below the file system 31, on the client side the operating system 24 includes a network access layer 34 and, at the lowest level, a media access layer 35. The network access layer 34 implements any of various protocols used to communicate with client devices, such as network file system (NFS), common Internet file system (CIFS) and/or hypertext transport protocol (HTTP). The media access layer 35 includes one or more drivers, which implemented the protocols used to communicate over the network, such as Ethernet.

Below the file system 31 on the storage device side, the operating system 24 includes a storage access layer 36 and, at the lowest level, a driver layer 37. The storage access layer 36 implements a disk storage protocol such as RAID, while the driver layer 37 implements a lower-level storage device access protocol, such as Fiber Channel or SCSI.

The operating system of 24 also includes a mirroring module 32, which is operatively coupled to the file system 31 and the storage access layer 36. The mirroring module 32 controls the synchronization of data at the remote secondary site with data stored at the primary site. The techniques introduced herein may be implemented at least partially within the mirroring module 32.

In one embodiment, a tree data-structure is used to represent data stored in the disks according to an active state of the file system of the filers 2 and 6. An example of a tree data-structure 39 shown in FIG. 4 of the drawings. The tree data-structure 39 includes a root node 40, which stores a pointer or reference to a sub-tree 41. The sub-tree 41 provides a representation of all blocks currently in use by the active file system maintained by the source filer 2. The tree structure may conveniently be thought of as a "snapshot" of all blocks in use by the active file system. A "snapshot" is a reference store or image of the file system at a point in time. In addition to a pointer to the sub-tree 41, the root node 40 includes pointers to various other sub-trees 42 (only one of which has been shown), wherein each sub-tree 42 provides a representation of blocks in use by an older version of the active file system stored at the source filer 2. For example, the root node has pointers 40A, 40B, and 40C. The pointer 40A always points to the sub-tree for the current active file system. The pointer 40B always points to sub-tree corresponding to a version of the file system just before the current version. The pointer 40C points to a sub-tree for a version of the file system which is just older than the version pointed to by the pointer 40B.

Each sub-tree 41, and 42 is constructed such that a node therein may be an address node that references an address block or a data node that references a data block. In the tree 41, the nodes 41A, 41C, and 41E are address nodes, whereas the nodes 41B, 41D, 41F and 41G are data nodes. In the tree 42, the nodes 42A, 42B, and 42D are address nodes and the nodes 42C, 42E, 42F and 42G are data nodes. Because the nodes within the trees 41, and 42 can either be address nodes, or data nodes, it is possible to reconstruct the entire trees 41 and 42 given the root node 40.

In accordance with one embodiment of the invention, a block of memory is not overwritten as long as the block of memory is referenced or occurs within a tree. Thus, a block of memory referenced or occurring within a tree is considered to be locked.

Figure 4:
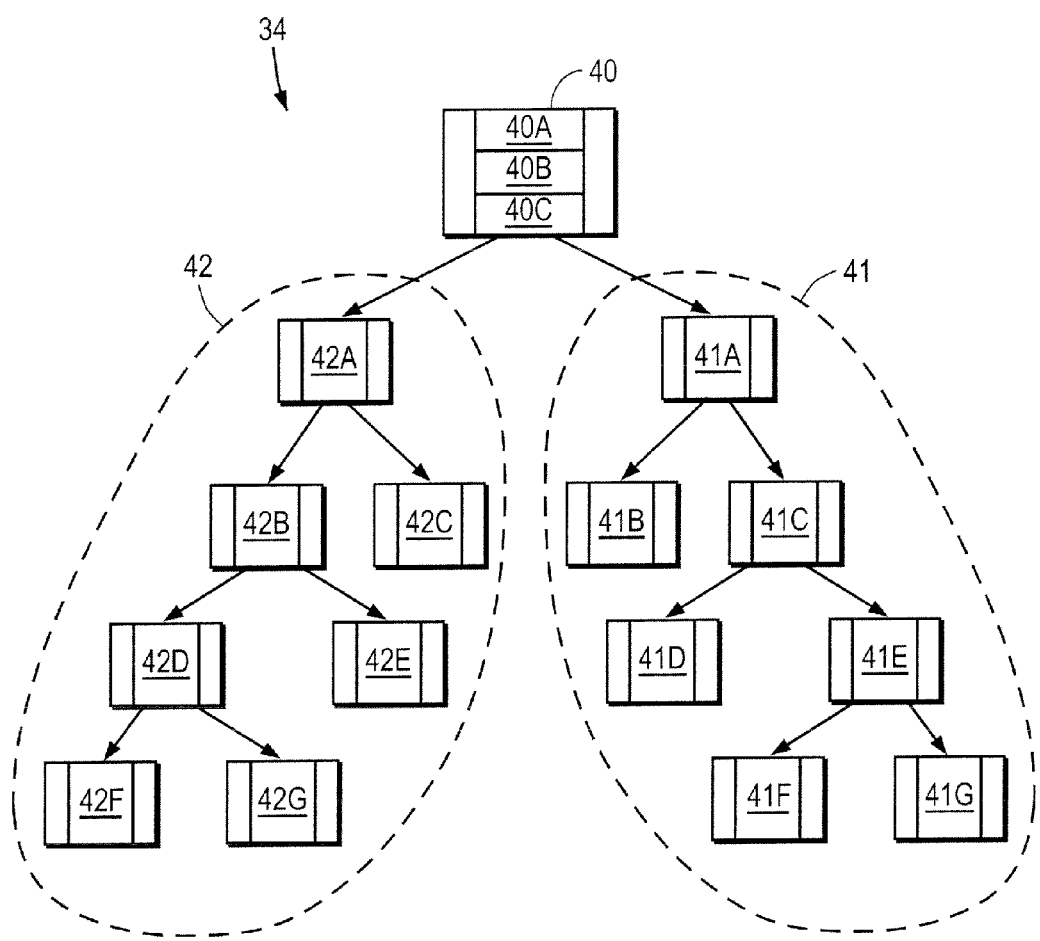
FIG. 4 shows a data-structure that may be used to implement aspects of the present invention.
Figure 5:
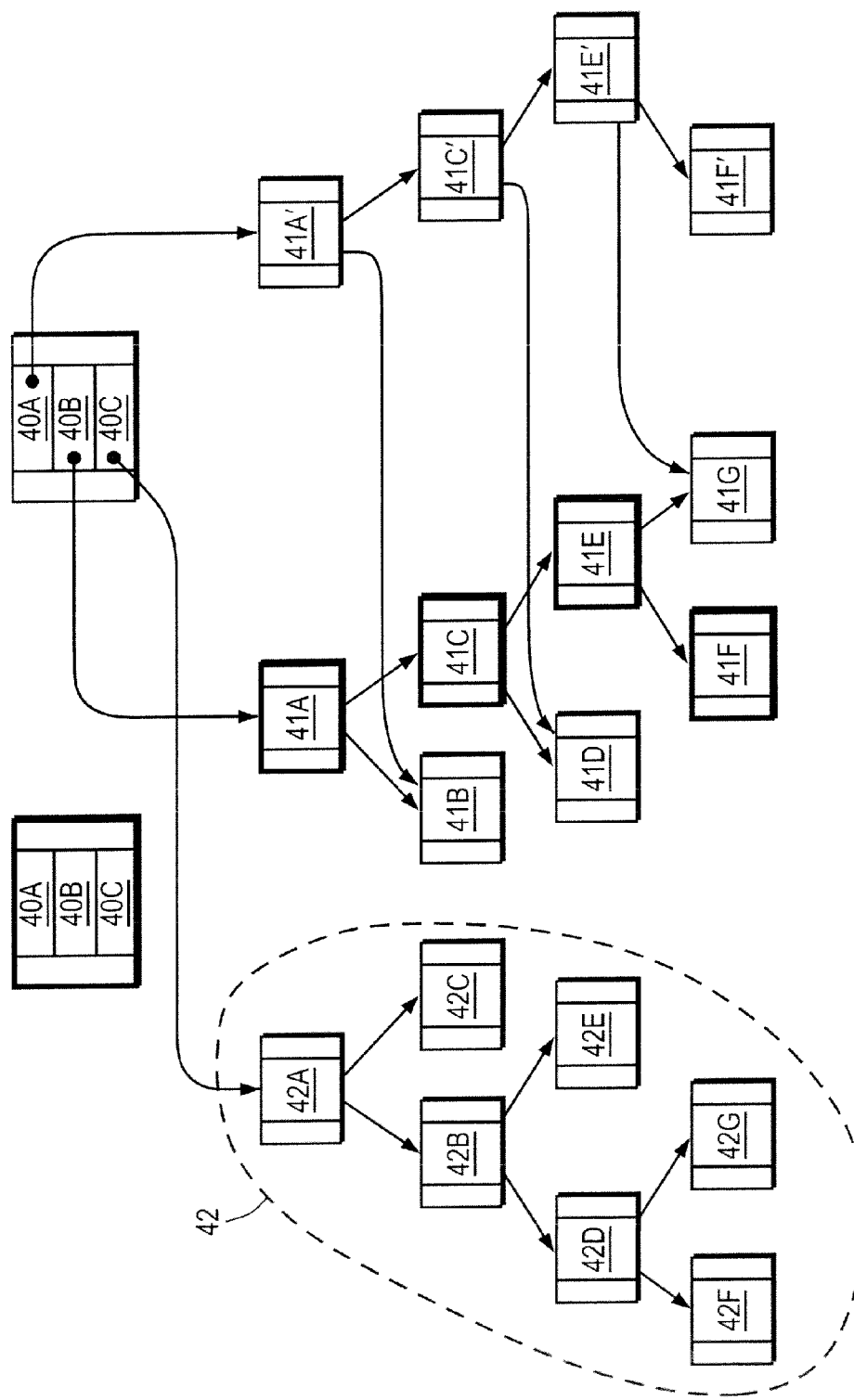
FIG. 5 illustrates how the data-structure of FIG. 4 may be updated, in accordance with one embodiment of the invention.

FIG. 5 of the drawings illustrates how the data-structure 39, shown in FIG. 4 of the drawings, is modified when a particular block referenced in the structure 39 is modified or updated e.g., based on a write request from one of the clients 1. In FIG. 5, the block 41F has been modified. As a result, each block that is an ancestor to block 41F in the tree 41 is no longer part of the active file system. New blocks 41F', 41E', 41C', and 41A' assigned as shown, and the pointer 40A to the sub-tree for the current active file system is updated to point to 41A'. The pointer 40B of the node 40 is updated to point to the node 41A, and the pointer 40C is made to point to the node 42A. Thus, it will be appreciated that the pointer 40C points to the oldest, most outdated version of the active file system, the point of 40B points to a slightly more current version of the active file system, and the pointer 40A points to the current version of the active file system. Depending on the implementation, it is possible to store more than three versions of the active file system.

Figure 6:
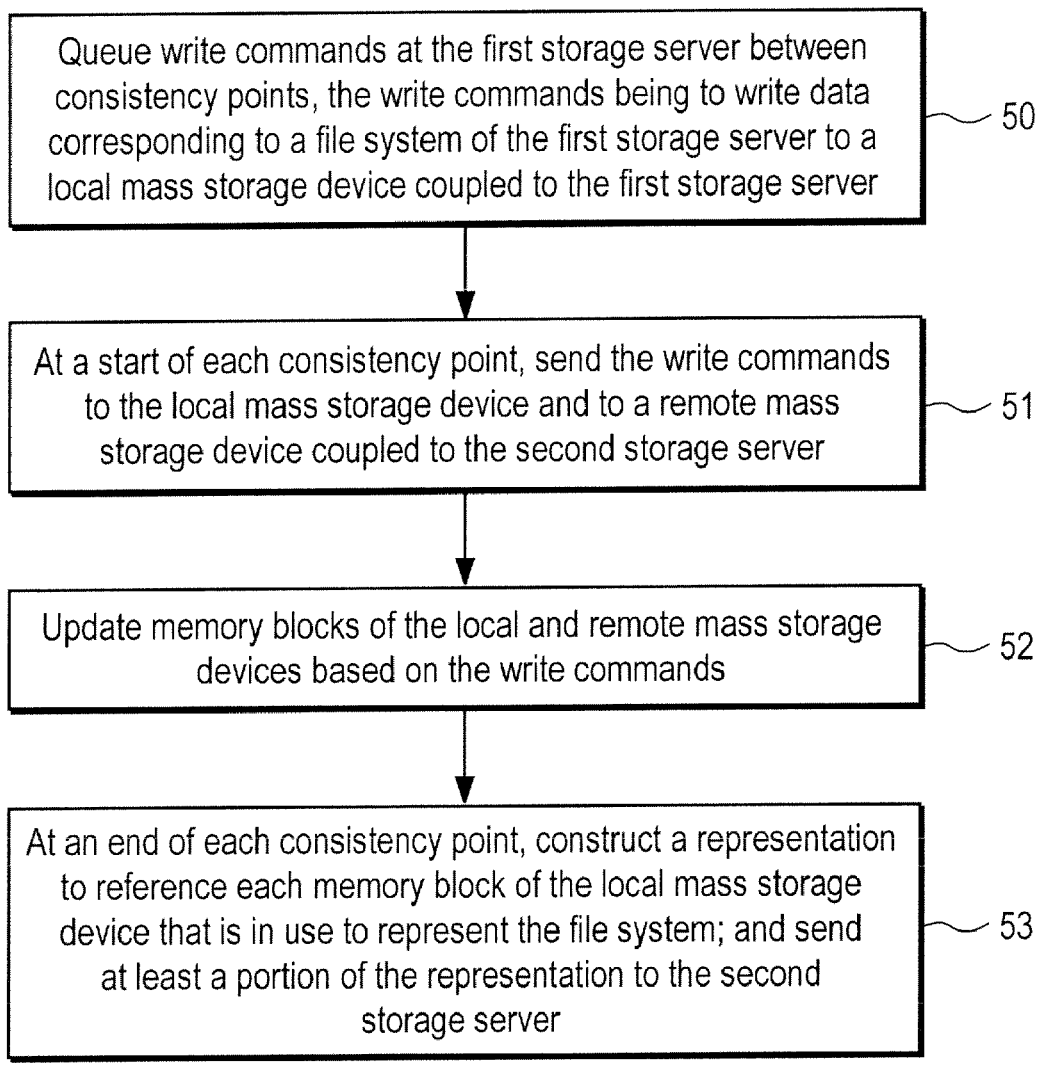
FIG. 6 shows a flowchart of operations performed in order to mirror data on the filers 2 and 6 of FIG. 1.

FIG. 6 of the drawings shows a flowchart of operations performed in one embodiment in order to mirror data on the 2 (the first storage device) and filer 6 (the second storage device). Referring to FIG. 6, the filer 2 receives various high-level write requests from the clients 1. At notes above, these high-level write requests may be in a high-level protocol such as the NFS, CIFS, and/or HTTP. The filer 2 responds to the high-level write requests by generating block-level write commands corresponding to the high-level write requests. At block 50, the block-level write commands are queued at the filer 2 between consistency points.

At block 51, at a start of each consistency point the filer 2 sends the queued write commands to its local mass storage devices for and to the remote mass storage devices 5 coupled to the destination filer 6. At block 52, memory blocks of the local mass storage devices 4, and the remote mass storage devices 5 are updated based on the write commands. At block 53, at the end of each consistency point, the source filer 2 constructs a representation or "snapshot" to reference each memory block of the local mass storage device 4 that is in use to represent the file system. The operations at block 53 also include sending the representation to the destination filer 6. Thus, at the end of the operations performed at block 53, the destination filer 6 has a representation or image of the memory blocks currently in use by the file system of source filer 2.

In one embodiment, the representation constructed at block 53 includes a tree data structure such as is shown and described with reference to FIGS. 4 and 5 of the drawings. Conveniently, instead of sending the entire tree data structure, only the root node of the tree data is sent, since the filer 6 is able to reconstruct the entire tree data structure based on the root node, as described above.

A further advantage of the techniques disclosed herein is that the filer 6 has a backup copy of the file system of the filer 2, and allows read-only access to the memory blocks in use by the file system, while simultaneously updating memory blocks of the mass storage device 5, as described above.

Figure 7:
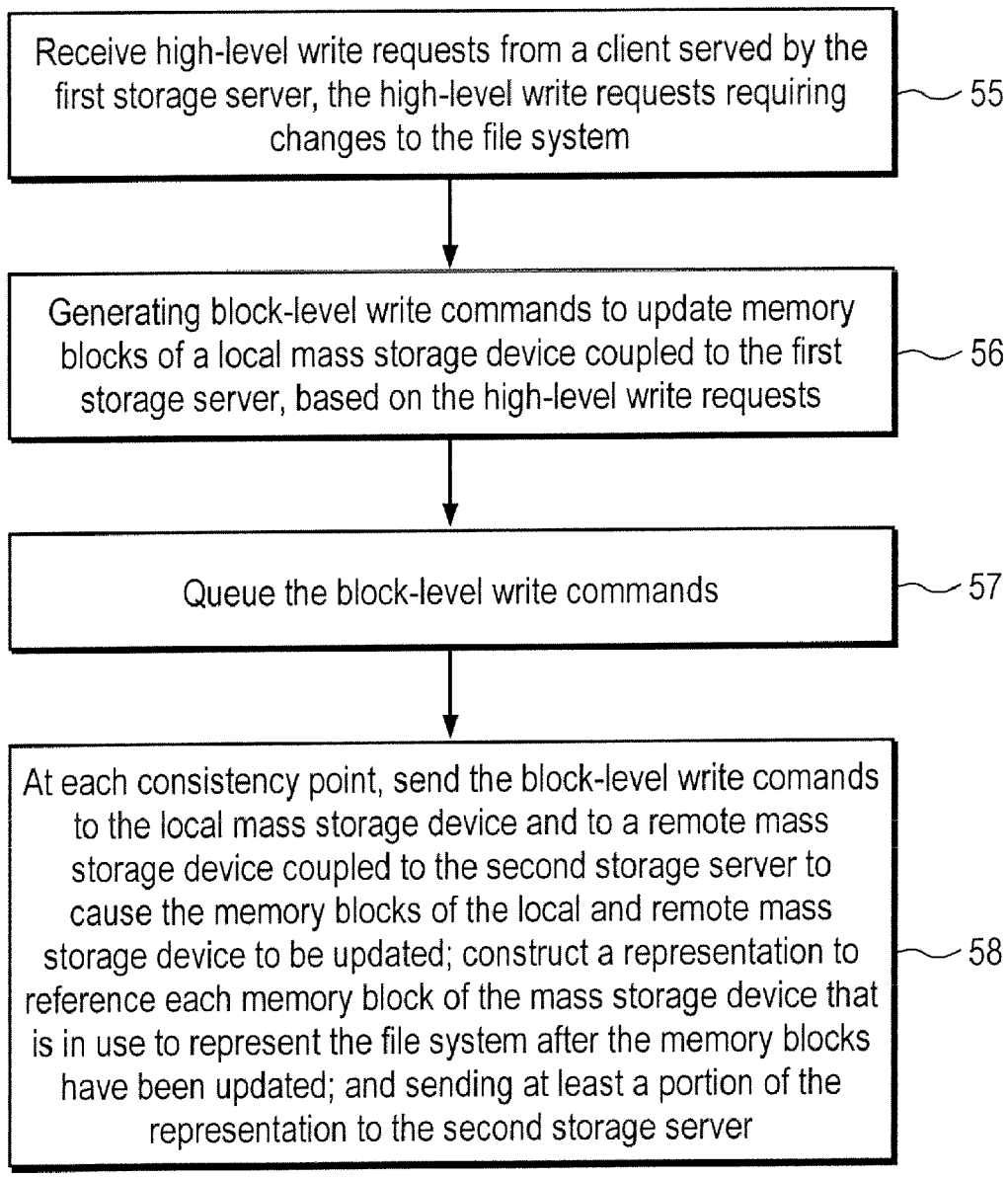
FIG. 7 shows a flowchart of operations performed by the source filer 2 of FIG. 1, in accordance with one embodiment of the invention.

FIG. 7 shows the operations performed by the filer 2, in order to mirror the file system of the filer 2 on the filer 6, in accordance with one embodiment. Referring to FIG. 7, at block 55, the filer 2 receives high-level write requests from the clients 1 that are served by the filer 2. The high-level write requests require changes to be made to the file system of source filer 2, and are in a high-level protocol such as NFS, CIFS and/or HTTP. At block 56, the source filer 2 generates block-level commands to update memory blocks of its local mass storage devices 4, based on the high-level write requests. At block 57, the block-level write commands are queued by the source filer 2. At block 58, at each consistency point, the source filer 2 sends the block-level write commands to its local mass storage devices 4, and to the remote mass storage devices 5 coupled to the destination filer 6. These block-level write commands cause memory blocks of the local and remote storage devices to be updated. Also at block 58, the source filer 2, constructs a representation to reference each memory block of its local mass storage devices 4 that is in use to represent the file system, after the memory blocks have been updated. Thereafter, the source filer 2, sends at least a portion of the representation (i.e., the root node of a tree data structure, described above) to the destination filer 6. Using the root node, the destination filer 6 is able to reconstruct the entire tree data structure and thus form an updated image of "snapshot" of memory blocks of the remote storage device 5 that are in use by the active state of the file system at the source filer 2.

Figure 8:
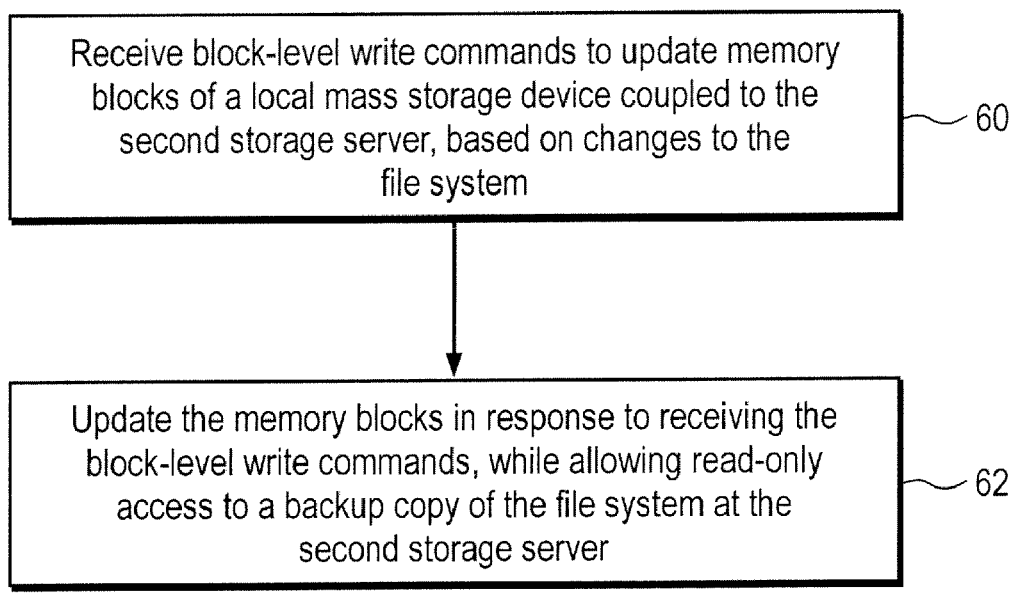
FIG. 8 shows the operations performed by the destination filer 6 of FIG. 1, in accordance with one embodiment of the invention.

FIG. 8 of the drawings shows the operations performed by the destination filer 6, in accordance with one embodiment, in order to mirror data of a file system of the source filer 2. Referring to FIG. 8, at block 60, the destination filer 6 receives block-level write commands to update the memory blocks of its local mass storage device, i.e., the storage devices 5, based on changes to the file system of the source filer 2. At block 62, the memory blocks of the mass storage device 5 is updated, in response to receiving the block-level write commands. The operations performed at block 60 and 62 are performed once at each consistency point. In one embodiment, the destination filer 6, also receives at least a portion of a representation constructed by the source filer 2 to reference each memory block of the mass storage devices 4 that are currently in use to represent an active state of the file system at the source filer 2. In one embodiment, the representation is in the form of the tree data structure described with reference to FIGS. 4 and 5 of the drawings. In this embodiment, the entire representation is not sent. Instead, only the root node of the tree data structure is sent to the destination filer 6, which then reconstructs the entire tree data structure, as described above. Thus, at the end of each consistency point, the destination filer 6 has a consistent image or "snapshot" of all blocks of the mass storage devices 5 currently in use by the file system of the filer 2, which makes comparing representations of the file system at the source and destination filers unnecessary.

In one embodiment, the destination filer 6 advantageously allows read-only access by clients to the active file system represented by memory blocks of the disks 5 while simultaneously allowing updating the memory blocks, as described. This simultaneous writing and reading is possible because of the block-writing scheme that is used in which if a block is referenced by a snapshot the block is not overwritten as is explained below. Each snapshot may be considered to hold or lock the blocks referenced therein. The active file system is represented by the latest snapshot which was taken at the last consistency point. Although block modifications (writes) are constantly being received from the source filer 2, these block modifications do not overwrite blocks locked by a snapshot. Thus, the latest snapshot is always guaranteed to have a consistent representation of all blocks used by the active file system, thereby making it possible to safely allow read-only access while allowing block modification.

The techniques introduced above have been described in the context of a NAS environment. However, these techniques can also be applied in various other contexts. For example, the techniques introduced above can be applied in a storage area network (SAN) environment or a direct attached storage (DAS) environment. A SAN is a highly efficient network of interconnected, shared storage devices. One difference between NAS and SAN is that in a SAN, the storage server (which may be a server) provides a remote host with block-level access to stored data, whereas in a NAS configuration, the storage server provides clients with file-level access to stored data. Thus, the techniques introduced above are not limited to use in a file server or in a NAS environment.

Thus, a method and apparatus for mirroring a file system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for mirroring data on a first storage server and a second storage server, the method comprising:
    queuing write commands in a temporary storage of the first storage server between consistency points, wherein each consistency point is an event characterized by executing the write commands queued in the temporary storage to write data corresponding to a file system of the first storage server to a local set of mass storage devices coupled to the first storage server;
    in response to initiation of each consistency point, concurrently sending the write commands queued in the temporary storage from the first storage server to the local set of mass storage devices and to a remote set of mass storage devices coupled to the second storage server, wherein the memory blocks of the local and remote sets of mass storage devices include address blocks that each store a pointer to another block in use by the file system, and data blocks that store data for the file system;

updating memory blocks of the local and remote sets of mass storage devices based on the write commands; and at an end of each consistency point, constructing a representation to reference each memory block of the local set of mass storage devices that is in use to represent the file system, the representation being in the form of a sub-tree structure that includes nodes that represent one or more of the address blocks and one or more of the data blocks, the sub-tree structure being rooted in a root node that includes a pointer to the sub-tree structure; and sending only said root node from the first storage server to the second storage server, said root node comprising information to allow reconstruction of the entire representation by the second storage server.

2. The method of claim 1, wherein updating the memory blocks is in accordance with a scheme in which a memory block referenced within a representation is not overwritten.

3. The method of claim 2, further comprising allowing read-only access to the remote set of mass storage devices while updating the memory blocks of the remote mass storage server.

4. A method for operating a first storage server to mirror a file system of the first storage server on a second storage server, the method comprising:

receiving high-level write requests from a client served by the first storage server, the high-level write requests requiring changes to the file system;

generating block-level write commands to update memory blocks of a local set of mass storage devices coupled to the first storage server, based on the high-level write requests;

queuing the block-level write commands in a temporary storage of the first storage server between consistency points, wherein each consistency point is an event characterized by executing the write commands queued in the temporary storage to write data corresponding to the file system to the local set of mass storage devices; and in response to initiation of each consistency point, concurrently sending the block-level write commands queued in the temporary storage from the first storage server to the local set of mass storage devices and to a remote set of mass storage devices coupled to the second storage server to cause the memory blocks of the local and remote sets of mass storage devices to be updated, wherein the memory blocks of the local and remote sets of mass storage devices include address blocks that each store a pointer to another block in use by the file system, and data blocks that store data for the file system; constructing a representation to reference each memory block of the local set of mass storage devices that is in use to represent the file system after the memory blocks have been updated, the representation being in the form of a sub-tree structure that includes nodes that represent one or more of the address blocks and one or more of the data blocks, the sub-tree structure being rooted in a root node that includes a pointer to the sub-tree structure; and sending only the root node from the first storage server to the second storage server, said root node comprising information to allow reconstruction of the entire representation by the second storage server.

5. A storage server, comprising:
a processor; and
a memory coupled to the processor, the memory storing instructions which when executed by the processor, cause the storage server to perform a method comprising:

receiving high-level write requests from a client served by the storage server, the high-level write requests requiring changes to a file system of the storage server;

generating block-level write commands to update memory blocks of a local set of mass storage devices coupled to the storage server based on the high-level write requests;

queuing the block-level write commands in a temporary storage of the storage server between consistency points, wherein each consistency point is an event characterized by executing the write commands queued in the temporary storage to write data corresponding to the file system to the local set of mass storage devices;

in response to initiation of each consistency point, concurrently sending the block-level write commands queued in the temporary storage from the storage server to the local set of mass storage devices and to a remote set of mass storage devices coupled to another storage server to cause the memory blocks of the local and remote sets of mass storage devices to be updated, wherein the memory blocks of the local and remote sets of mass storage devices include address blocks that each store a pointer to another block in use by the file system, and data blocks that store data for the file system; constructing a representation to reference each memory block of the local set of mass storage devices that is in use to represent the file system, after the memory blocks have been updated, the representation being in the form of a sub-tree structure that includes nodes that represent one or more of the address blocks and one or more of the data blocks, the sub-tree structure being rooted in a root node that includes a pointer to the sub-tree structure; and sending only said root node from said storage server to the other storage server, said root node comprising information to allow reconstruction of the entire representation by the other storage server.

6. A computer-readable medium, having stored thereon a sequence of instructions, which when executed by a computer, cause the computer to perform a method comprising:

receiving high-level write requests from a client served by a first storage server, the high-level write requests requiring changes to a file system of the first storage server;

generating block-level write commands to update memory blocks of a local set of mass storage devices coupled to the first storage server, based on the high-level write requests;

queuing the block-level write commands in a temporary storage of the first storage server between consistency points, wherein each consistency point is an event characterized by executing the write commands queued in the temporary storage to write data corresponding to the file system to the local set of mass storage devices; and in response to initiation of each consistency point, concurrently sending the block-level write commands queued in the temporary storage from the first storage server to the local set of mass storage devices and to a remote set of mass storage devices coupled to a second storage server to cause the memory blocks of the local and remote sets of mass storage devices to be updated, wherein the memory blocks of the local and remote sets of mass storage devices include address blocks that each store a pointer to another block in use by the file system, and data blocks that store data for the file system; constructing a representation to reference each memory block of the local set of mass storage devices that is in use to represent the file system, after the memory blocks have been updated, the representation being in the form of a sub-tree structure that includes nodes that represent one or more of the address blocks and one or more of the data blocks, the sub-tree structure being rooted in a root node that includes a pointer to the sub-tree structure, and sending only said root node from the first storage server to the second storage server, said root node comprising information to allow reconstruction of the entire representation by the second storage server.

7. A method comprising:

at each of a series of consistency points, constructing a representation of a file system, the representation being in the form of a sub-tree structure that includes a plurality of nodes and includes pointers to each memory block used to store a file system maintained by a first server, the sub-tree structure being rooted at a root node, said each memory block belonging to a first set of mass storage devices coupled locally to the first server, wherein each consistency point is an event characterized by, in response to initiation of the consistency point, sending block-level write commands, queued in a temporary storage of the first server between consistency points, concurrently to the first set of mass storage devices to update memory blocks of the first set of mass storage devices and to a second set of mass storage devices coupled locally to a second server to update memory blocks of the second set of mass storage devices; and sending only said root node from the first server to the second server at each said consistency point, said root node comprising information to allow reconstruction of the entire representation by the second server.

* * * * *